US008768703B2

(12) United States Patent
Chang et al.

(10) Patent No.: US 8,768,703 B2
(45) Date of Patent: *Jul. 1, 2014

(54) METHODS AND APPARATUS TO PRESENT A VIDEO PROGRAM TO A VISUALLY IMPAIRED PERSON

(75) Inventors: Hisao M. Chang, Cedar Park, TX (US); Horst Schroeter, New Providence, NJ (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,192

(22) Filed: Jul. 19, 2012

(65) Prior Publication Data

US 2012/0284028 A1    Nov. 8, 2012

Related U.S. Application Data

(63) Continuation of application No. 12/102,310, filed on Apr. 14, 2008, now Pat. No. 8,229,748.

(51) Int. Cl.
*G10L 13/08* (2013.01)
*G10L 13/00* (2006.01)
*G10L 15/26* (2006.01)
*G10L 15/06* (2013.01)
*G10L 21/00* (2013.01)
*G10L 21/06* (2013.01)

(52) U.S. Cl.
USPC ........... 704/260; 704/235; 704/243; 704/258; 704/270; 704/270.1; 704/273; 704/276

(58) Field of Classification Search
USPC ................ 704/235, 243, 273, 276, 260, 270, 704/270.1, 271, 257, 258, 9, 10, 275
See application file for complete search history.

(56) References Cited

U.S. PATENT DOCUMENTS

| 5,572,260 | A | * | 11/1996 | Onishi et al. ................ 348/460 |
| 5,677,739 | A | | 10/1997 | Kirkland |
| 5,900,908 | A | | 5/1999 | Kirkland |
| 5,933,805 | A | | 8/1999 | Boss et al. |
| 6,209,028 | B1 | | 3/2001 | Walker et al. |
| 6,263,505 | B1 | | 7/2001 | Walker et al. |

(Continued)

FOREIGN PATENT DOCUMENTS

GB    2405018    2/2005

OTHER PUBLICATIONS

Lee et al., "Emotive Captioning," ACM Computers in Entertainment, vol. 5, No. 2, Article xx, Aug. 2007, 15 pages.

(Continued)

*Primary Examiner* — Edgar Guerra-Erazo
(74) *Attorney, Agent, or Firm* — Hanley, Flight & Zimmerman, LLC (57) ABSTRACT

Methods and apparatus to present a video program to a visually impaired person are disclosed. An example method comprises detecting a text portion of a media stream including a video stream, the text portion not being consumable by a blind person, retrieving text associated with the text portion of the media stream, and converting the text to a first audio stream based on a first type of a first program in the media stream, and converting the text to a second audio stream based on a second type of a second program in the media stream.

23 Claims, 7 Drawing Sheets

(56) References Cited

U.S. PATENT DOCUMENTS

| | | | |
|---|---|---|---|
| 6,273,726 B1 * | 8/2001 | Kirksey et al. | 434/169 |
| 6,324,511 B1 * | 11/2001 | Kiraly et al. | 704/260 |
| 6,452,640 B1 | 9/2002 | Yuen et al. | |
| 6,630,963 B1 | 10/2003 | Billmaier | |
| 6,721,015 B2 | 4/2004 | Yuen et al. | |
| 7,221,405 B2 | 5/2007 | Basson et al. | |
| 7,263,488 B2 | 8/2007 | Chu et al. | |
| 7,483,834 B2 | 1/2009 | Naimpally et al. | |
| 7,631,326 B2 | 12/2009 | Kaneko | |
| 7,812,885 B2 * | 10/2010 | Molaro et al. | 348/468 |
| 7,966,184 B2 | 6/2011 | O'Conor et al. | |
| 8,090,402 B1 * | 1/2012 | Fujisaki | 455/556.1 |
| 8,225,232 B2 * | 7/2012 | Sundararaman et al. | 715/811 |
| 8,229,748 B2 | 7/2012 | Chang et al. | |
| 2002/0010575 A1 | 1/2002 | Haase et al. | |
| 2003/0105639 A1 | 6/2003 | Naimpally et al. | |
| 2003/0158737 A1 * | 8/2003 | Csicsatka | 704/273 |
| 2003/0216922 A1 | 11/2003 | Gonzales et al. | |
| 2004/0168187 A1 | 8/2004 | Chang | |
| 2004/0186713 A1 * | 9/2004 | Gomas et al. | 704/235 |
| 2005/0068462 A1 * | 3/2005 | Harris et al. | 348/473 |
| 2005/0123200 A1 * | 6/2005 | Myers et al. | 382/182 |
| 2005/0144003 A1 | 6/2005 | Iso-Sipila | |
| 2006/0085265 A1 * | 4/2006 | Dietz et al. | 705/15 |
| 2006/0280338 A1 * | 12/2006 | Rabb | 382/114 |
| 2007/0055938 A1 * | 3/2007 | Herring et al. | 715/729 |
| 2007/0153125 A1 | 7/2007 | Cooper et al. | |
| 2008/0140382 A1 * | 6/2008 | Jones et al. | 704/2 |
| 2009/0076819 A1 | 3/2009 | Wouters et al. | |
| 2009/0083801 A1 | 3/2009 | Hardacker et al. | |
| 2009/0190899 A1 | 7/2009 | Bangalore | |
| 2009/0259473 A1 | 10/2009 | Chang et al. | |
| 2010/0138789 A1 * | 6/2010 | Park | 715/825 |

OTHER PUBLICATIONS

Zandifar et al., "A Video based Interface to Textual Information for the Visually Impaired," Multimodal Interfaces, IEEE, 2002, 6 pages.

Lodge, N.K., "The European Audetel Project-Enhancing Television for Visuallu Impaired People," IEE Colloquium, May 5, 1993, 7 pages.

United States Patent and Trademark Office, "Notice of Allowance," issued in connection with U.S. Appl. No. 12/102,310, mailed Mar. 29, 2012, 15 pages.

United States Patent and Trademark Office, "Non-Final Office Action," issued in connection with U.S. Appl. No. 12/102,310, mailed Oct. 13, 2011, 28 pages.

* cited by examiner

METHODS AND APPARATUS TO PRESENT A VIDEO PROGRAM TO A VISUALLY IMPAIRED PERSON

CROSS-REFERENCE TO RELATED APPLICATIONS

This arises from a continuation of U.S. patent application Ser. No. 12/102,310, filed Apr. 14, 2008, entitled "METHODS AND APPARATUS TO PRESENT A VIDEO PROGRAM TO A VISUALLY IMPAIRED PERSON," now U.S. Pat. No. 8,229,748, which is hereby incorporated herein by reference in its entirety.

FIELD OF DISCLOSURE

This disclosure relates generally to video programs and, more particularly, to methods and apparatus to present a video program to a visually impaired person.

BACKGROUND

Visually impaired persons often face a myriad of challenges as they navigate through their daily lives. Some utilize canes to more easily navigate homes, business, sidewalks, etc. Some also utilize service animals to assist in the location of items and/or for navigation assistance. Moreover, many visually impaired persons struggle to read signs, books, newspapers, magazines and/or to watch video programs.

DETAILED DESCRIPTION

Methods and apparatus to present a video program to a visually impaired person are disclosed. A disclosed example method includes receiving a video stream and an associated audio stream of a video program, detecting a portion of the video program that is not readily consumable by a visually impaired person, obtaining text associated with the portion of the video program, converting the text to a second audio stream, and combining the second audio stream with the associated audio stream.

A disclosed example set-top box (STB) includes a network interface to receive a video stream and an associated audio stream, a detector to identify a portion of the video stream that is not readily consumable by a visually impaired person, a text locator to obtain text associated with the portion of the video stream, a text-to-speech (TTS) module to convert the text to a second audio stream, and a mixer to combine the second audio stream with the associated audio stream.

While methods and apparatus to present a video program to a visually impaired person for an Internet-based video delivery system (e.g., those associated with provided Internet protocol (IP) television (IPTV)) are described herein, the example methods and apparatus may, additionally or alternatively, be used to present video programs to visually impaired persons for other types of video delivery systems. Other example video delivery systems include, but are not limited to, those associated with a compact disc (CD), a digital versatile disc (DVD), a coaxial cable distribution system, a satellite or other extra-terrestrial system, and/or any combination and/or hybrid of storage, Internet, coaxial cable, satellite and/or extra-terrestrial based video delivery systems. Moreover, the methods and apparatus may be used to present a video program to a non-visually impaired persons.

Figure 1:
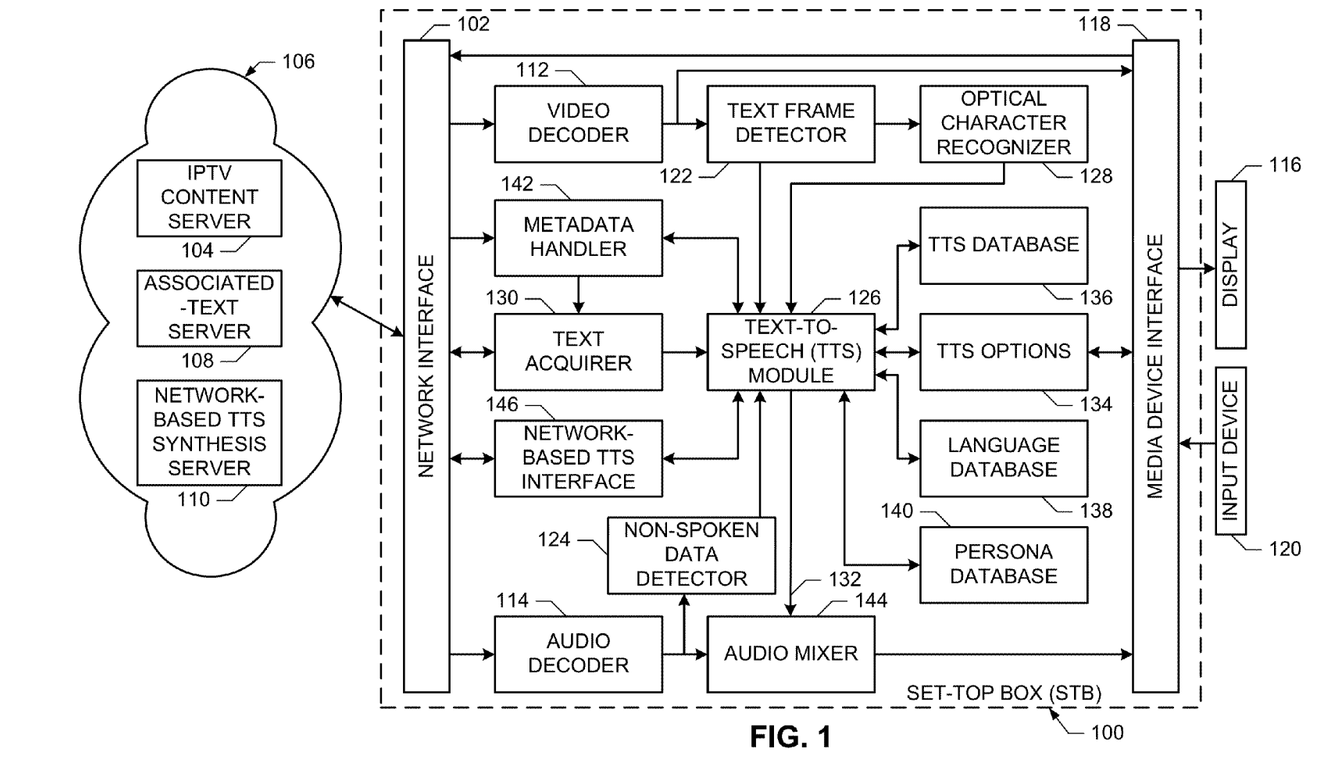
FIG. 1 is a schematic illustration of an example set-top box (STB) constructed in accordance with the teachings of the disclosure.

FIG. 1 is a schematic illustration of an example STB 100 that, in addition to receiving and presenting video programs to a user, detects textual portions of a video program that are not readily consumable by a visually impaired person, converts said textual portions into corresponding audio data, and presents the thus generated audio data to the visually impaired person to aid in the consumption of the video program. Example textual portions include, but are not limited to a series of video frames presenting a substantially static text-based information screen (e.g., the example screen snapshot of FIG. 2), a series of video frames presenting scrolling text within all or a portion of a screen (e.g., the example screen snapshots of FIGS. 3A and 3B), and/or text-based information that describes a series of video frames that do not have associated spoken words (e.g., when a panoramic scene is being displayed but no person is speaking, and the text-based information describes the scene being displayed). It will be readily understood that such text-based portions and any other type(s) of text-based portions of a video program are not readily consumable by visually impaired persons.

Figure 2:
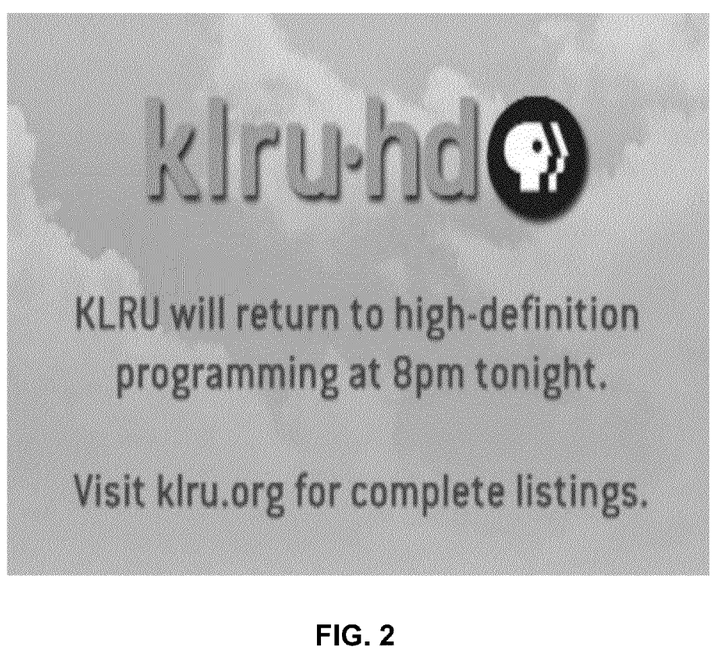
FIG. 2 illustrates an example portion of a video stream that contains text not readily consumable by a visually impaired person.

The example screen snapshot of FIG. 2 illustrates an example information screen that may be presented to a user. For example, such information screens may be displayed while a particular television station is not currently broadcasting, is experiencing technical difficulties, and/or is providing text-based information in the middle of an ongoing video program. In general, such information screens are formatted to allow easy reading by non-visually impaired persons. An example screen contains 6 lines of text and 30 characters per line. Text-based information screens are displayed over a plurality of video frames such that a viewer has adequate time to read the presented text (e.g., assuming the text can be read at a rate of approximately 120 words per minute). There may or may not be an audio stream (e.g., background music) associated with the information screen.

Figure 3A:
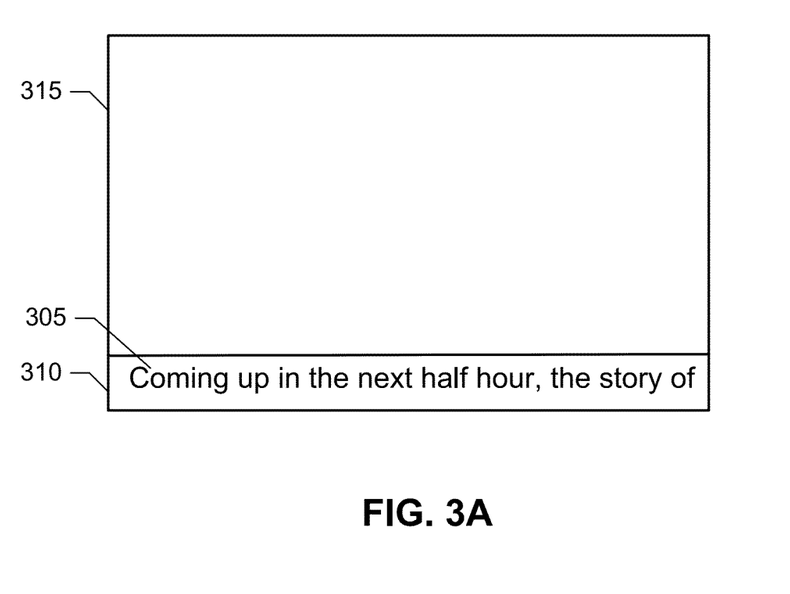
FIGS. 3A and 3B illustrate an example portion of a video stream that contains scrolling text not readily consumable by a visually impaired person.
Figure 3B:
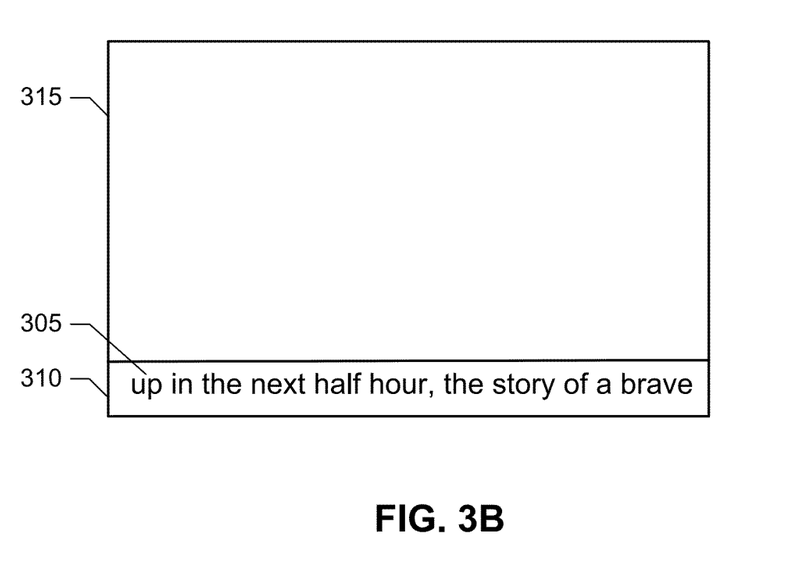

The example screen snapshots of FIGS. 3A and 3B illustrate the display of a video stream having associated and/or overlaid text 305, which is scrolling right to left. In the illustrated example of FIGS. 3A and 3B, the scrolling text 305 is displayed in a lower portion 310 of the screen, while an upper portion 315 of the screen is displaying all or a cropped version of a video program. Both the scrolling text 303 and a video program displayed in the upper portion are provided via the same video stream. For example, the upper portion 315 may be displaying a news program while the lower portion 310 is displaying headlines associated with other news stories. Additionally or alternatively, the portion 310 may be overlaid onto all or some of the portion 315 such that the portion 315 is at least partially viewable beneath the portion 310. For example, when credits of a movie are displayed.

Returning to FIG. 1, to receive video programs, the example STB 100 of FIG. 1 includes any number and/or type(s) of network interfaces, one of which is designated at reference numeral 102. The example network interface 102 of FIG. 2 communicatively couples the example STB 100 to one or more IPTV content servers (one of which is designated at reference numeral 104) via any number and/or type(s) of public and/or private IP networks 106 such as the Internet. The example network interface 102 may, additionally or alternatively, be used to obtain text-based information and/or descriptions from an associated-text server 108, and/or audio data corresponding to text from a network-based TTS synthesis server 110.

While the example IP network 106 of FIG. 1 couples the example STB 100 to the IPTV server 104, the example associated-text server 108, and/or the example network-based TTS synthesis server 110, any number and/or type(s) of past, current and/or future communication network(s), communication system(s), communication device(s), transmission medium(s), protocol(s), technique(s), specification(s) and/or standard(s) could be used to couple the STB 100 to the IPTV server 104, the associated-text server 108 and/or the network-based TTS synthesis sever 110. Interfaces between the STB 100 and the IP network 106 (e.g., the example network interface 102) may be implemented using any combination, number and/or type(s) of past, present and/or future device(s), technology(-ies) and/or method(s). For instance, the example network interface 102 may implement any type(s) of voiceband modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax) access point(s), and/or any combination thereof. Moreover, the example IP network 106 of FIG. 1 may extend geographically to include a location near to and/or encompassing the STB 100. For example, the IP network 106 may include a wireless access point (not shown) by which, for example, the example STB 100 connects to the IP network 106.

To decode video programs received from the IPTV content server 104, the example STB 100 of FIG. 1 includes any number and/or type(s) of video decoders (one of which is designated at reference numeral 112), and any number and/or type(s) of audio decoders (one of which is designated at reference numeral 114). The example video decoder 112 of FIG. 1 extracts and/or decodes video frames of a video program such that the video frames may be presented at a display 116 via any number and/or type(s) of media device interfaces (one of which is designated at reference numeral 118). Likewise, the example audio decoder 114 of FIG. 1 extracts and/or decodes audio data and/or streams of a video program such that the audio data and/or streams may be displayed at the display 116 (e.g., via one or more speakers) via the media device interface 118. The example video decoder 112 and the example audio decoder 114 are implemented in accordance with any past, present and/or future standard(s), recommendation(s) and/or specification(s), such as moving pictures expert group (MPEG)-1, MPEG-2, MPEG-4, and/or the International Telecommunications Union-Telecommunications Sector (ITU-T) H.264 standards.

Example displays 116 include, but are not limited to, a television, a high-definition (HD) television, and/or a computer monitor. The example media device interface 118 of FIG. 1 may be implemented in accordance with any past, present and/or future standard(s), recommendation(s) and/or specification(s), such as a high-definition multimedia interface (HDMI) interface, an S-Video interface, a component video interface, a composite video interface, a digital visual interface (DVI) interface, etc.

As illustrated in the example of FIG. 1, the media device interface 118 also enables a user to provide inputs and/or selections to the STB 100 via any number and/or type(s) of input devices, one of which is designated at reference numeral 120. Example input devices 120 include, but are not limited to, a remote control, a mouse, and/or a keyboard.

To detect portions of a video stream that are not readily consumable by a visually impaired person, the example STB 100 of FIG. 1 includes a text frame detector 122 and a non-spoken data detector 124. Using any number and/or type(s) of algorithm(s), method(s), logic, device(s) and/or circuit(s), the example text frame detector 122 of FIG. 1 compares one or more adjacent video frames to detect a substantially stationary image (e.g., the example screen snapshot of FIG. 2), and/or a portion of a display containing scrolling text (e.g., the example screen snapshots of FIGS. 3A and 3B). For example, if a difference between two adjacent video frames does not exceed a threshold, the image may correspond to an information screen. Likewise, if a portion of a video frame remains unchanged but moves upwards, downwards, right or left in subsequent video frames it may correspond to scrolling text. For example, when a word and/or phrase appears at the top of a display and then moves downwards as the video program continues.

Using any number and/or type(s) of algorithm(s), method(s), logic, device(s) and/or circuit(s), the example non-spoken data detector 124 of FIG. 1 analyzes the audio data decoded by the audio decoder 114 to identify portions of the audio data that do not contain spoken words but may contain, for example, music, other sounds and/or silence. Such identified portions may be associated with portions of the video program that may not be readily consumable by a visually impaired person, since they may not be presented sufficient information to determine what is being displayed.

To render substantially all of a video programmable consumable by a visually impaired person, the example STB 100 of FIG. 1 includes a TTS module 126. The example TTS module 126 of FIG. 1 converts text collected, acquired, detected, recognized and/or otherwise obtained by an optical character recognizer 128 and/or a text acquirer 130 into an audio stream 132. An example manner of implementing the example TTS module 126 of FIG. 1 is described below in connection with FIG. 4. As described below in connection with FIGS. 4-6, the example TTS module 126 can perform text-to-speech synthesis based on one or more of user options and/or preferences 134, a TTS database 136, a language database 138, and/or a persona database 140.

To extract text from one or more video frames containing static, moving and/or scrolling text, the example STB 100 of FIG. 1 includes the example optical character recognizer 128. Using any number and/or type(s) of algorithm(s), method(s), logic, device(s) and/or circuit(s), the example optical character recognizer 128 of FIG. 1 extracts text from one or more video frames identified by the example text frame detector 122, and provides the extracted text to the example TTS module 126. For example, if a substantially static text-based screen is detected by the text frame detector 122, the example optical character recognizer 128 of FIG. 1 performs optical character recognition of a single video frame to extract the displayed text. Additionally or alternatively, if text is moving in a plurality of video frames, the example optical character recognizer 128 performs optical character recognition of each of the plurality of video frames, and then processes the extracted text to recreate the displayed text. For instance, for the example video frame of FIG. 3A the optical character recognizer 128 extracts the text "Coming up in the next half hour, the story of," and for the example video frame of FIG. 3B the optical character recognizer 128 extracts the text "up in the next half hour, the story of a brave." The optical character recognizer 128 then recognizes that "up in the next half hour, the story of" occurred in both video frames and removes the same from the text extracted from the frame of FIG. 3B to create combined extracted text of "Coming up in the next half hour, the story of a brave." The process may then be repeated for subsequent video frames.

To acquire text associated with portions of a video frame not containing any spoken words, the example STB 100 of FIG. 1 includes the example text acquirer 130 and a metadata handler 142. The example metadata handler 142 of FIG. 1 examines metadata contained within a received video stream to identify one or more links (e.g., uniform resource locators and/or IP addresses) to text-based descriptions associated with portions of the received video stream not readily consumable by a visually-impaired person. A video program may be provided with any number of such links corresponding to any number of portions of the video program. Such links may also be provided for text-based portions of a video program, such as those described above in connection with FIGS. 2, 3A and/or 3B. In such instances, the text may be obtained via either the text acquirer 130 or the text frame detector and the optical character recognizer 128. The example text acquirer 130 of FIG. 1 uses a link detected by the metadata handler 142 to obtain text-based description data from a server (e.g., the example associated-text server 108) associated with the link, and provides the obtained text to the example TTS module 126. In some examples, the data obtained from the associated-text server 108 is constructed in accordance with markup language data that contains and/or includes timestamps and/or video frame reference numerals that allow the example TTS module 126 of FIG. 1 to synchronize audio data created by the example TTS module 126 based on the text to the audio data decoded by the example audio decoder 114. In some examples, the links are broadcast and/or provided ahead of their corresponding audio portions to ensure the data associated with the link can be retrieved in time for use with the appropriate portion of the program. Additionally or alternatively, the STB 100 could implement one or more buffers and/or queues that delay the presentation of program to allow data associated with the link to be retrieved. While an example link detected by the example metadata handler 134 is contained within a received video program, such links need not be provided together with a video program. For example, the example text acquirer 130 of FIG. 1 could query a database associated with the example associated-text server 108 to directly obtain links and/or associated text data for a video program that is being received. Moreover, the IPTV content server 104 and the associated-text server 108 need not be operated by the same service provider and/or need not be accessed using the same user account. In some examples, a user of the example STB 100 subscribes to an associated text service provided via the associated-text server 108 by paying a monthly access fee. The example text acquirer 130 may also access associated text data provided by more than one associated-text server 108 and/or via more than one user account and/or subscription.

To combine the example audio stream 132 with the audio data decoded by the example audio decoder 114, the example STB 100 of FIG. 1 includes any type(s) of audio mixer 144. Using any number and/or type(s) of logic, device(s), component(s) and/or circuit(s), the example audio mixer 144 of FIG. 1 combines audio data created by the example TTS module 126 with audio data decoded by the example audio decoder 114 (e.g., with the original program audio). For example, if the audio data decoded by the audio decoder 114 is arranged for a surround sound speaker system, the example audio mixer 142 mixes the audio data 132 with the audio data for a set of front speakers, leaving the audio data for other speakers unchanged. In another example, if the audio data decoded by the audio decoder 114 is arranged for stereo sound, the example audio mixer 144 could mix the audio data 132 with the audio data for both the left and right speakers.

To access a network-based TTS synthesis server, the example STB 100 of FIG. 1 includes a network-based TTS interface 146. The example network-based TTS interface 146 of FIG. 1 allows the example TTS module 126 to access a network-based TTS synthesis server 110 to convert text into audio data. For example, if a word and/or phrase to be converted does not have associated audio data in the example TTS database 136, the example TTS module 126 queries the network-based TTS synthesis server 110 via the interface 146 to obtain corresponding audio data. Additionally or alternatively, as described below in connection with FIG. 4, the example TTS module 126 may implement a TTS engine. However, by accessing the example network-based TTS synthesis server 110, more sophisticated, complicated and/or updated TTS conversions (e.g., due to more processing power and/or memory being available at the server 110 compared to the TTS module 126) may be used to convert text to speech, and the TTS module 126 need only perform a cache based TTS playback.

While example manners of implementing an STB has illustrated in FIG. 1, one or more of the elements, processes and/or devices illustrated in FIG. 1 may be combined, divided, re-arranged, omitted, eliminated and/or implemented in any other way. Further, the example network interface 102, the example video decoder 112, the example audio decoder 114, the example media device interface 118, the example text frame detector 122, the example non-spoken data detector 124, the example TTS module 126, the example optical character recognizer 128, the example text acquirer 130, the example metadata handler 142, the example audio mixer 144, the example network-based TTS interface 146, and/or, more generally, the example STB 100 may be implemented by hardware, software, firmware and/or any combination of hardware, software and/or firmware. Thus, for example, any or the example network interface 102, the example video decoder 112, the example audio decoder 114, the example media device interface 118, the example text frame detector 122, the example non-spoken data detector 124, the example TTS module 126, the example optical character recognizer 128, the example text acquirer 130, the example metadata handler 142, the example audio mixer 144, the example network-based TTS interface 146, and/or, more generally, the example STB 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example network interface 102, the example video decoder 112, the example audio decoder 114, the example media device interface 118, the example text frame detector 122, the example non-spoken data detector 124, the example TTS module 126, the example optical character recognizer 128, the example text acquirer 130, the example metadata handler 142, the example audio mixer 144, the example network-based TTS interface 146, and/or, more generally, the example STB 100 are hereby expressly defined to include a tangible medium such as a memory, a DVD, a CD, etc. Further still, the STB 100 may include one or more elements, processes and/or devices in addition to, or instead of, those illustrated in FIG. 1, and/or may include more than one of any or all of the illustrated elements, processes and devices.

Figure 4:
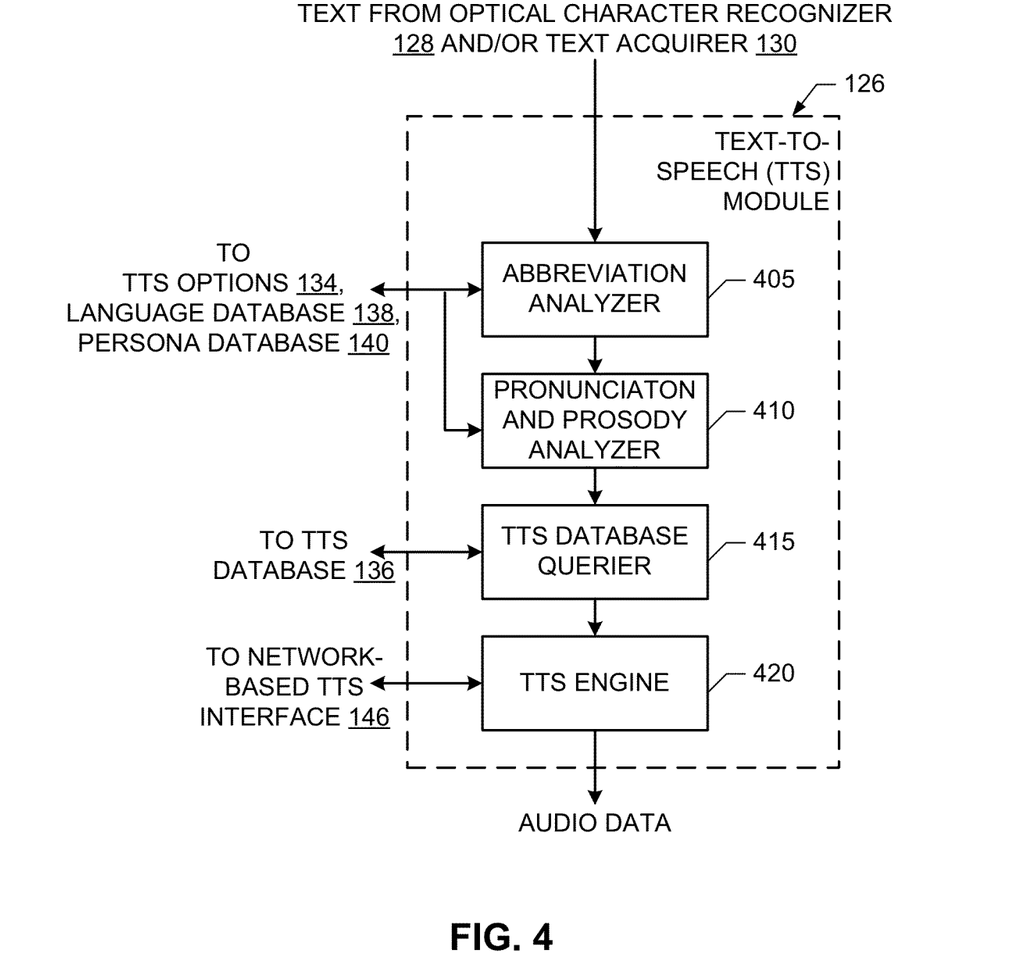
FIG. 4 illustrates an example manner of implementing the example text-to-speech (TTS) module of FIG. 1.

FIG. 4 illustrates an example manner of implementing the example TTS module 126 of FIG. 1. To convert characters into pronounceable words, the example TTS module 126 of FIG. 4 includes an abbreviation analyzer 405. Using any number and/or type(s) of algorithm(s), rule(s), logic and/or method(s), the example abbreviation analyzer 405 of FIG. 4 recognizes character strings ("Dr." or "Dr"), and converts the same into pronounceable words (e.g., "Doctor" or "Drive") depending, for example, on the context of the character strings. The example abbreviation analyzer 405 consults one or more of the example TTS options 134, the example language database 138 and/or the example persona database 140 of FIG. 1 when performing pronunciation analysis. For example, depending upon the spoken language of a video program, the abbreviations for words may be different.

To perform prosody analysis, the example TTS module 126 of FIG. 4 includes a pronunciation and prosody analyzer 410. Using any number and/or type(s) of algorithm(s), rule(s), logic and/or method(s), the example pronunciation and prosody analyzer 410 of FIG. 4 adds any number and/or type(s) of prosody annotations to detected words and/or phrases. For example, the word "myriad" may be annotated as "myr●i●ad" or "'mir-ē-ad" to indicate how the word should be pronounced. Other example prosody annotations indicate changes in pitch. For example, the annotation " " may be added to the end of a phrase (e.g., "You know whom") to indicate that the phase corresponds to a statement or conclusion, while the annotation " " may be added to indicate that the phrase corresponds to a question. Prosody annotations may be made based upon one more of a selected language, or a selected speaker persona (e.g., male or female) as configured by a user in the example TTS options 134. Based upon a selected language and/or selected persona, the example pronunciation and prosody analyzer 410 may consult one or more of the example language database 138 and/or the example persona database 140 for pronunciation information. In some examples, the selected language and/or the selected persona may depend upon a type of video program being viewed. For example, a user may configure a male voice for news program and a female voice for situational comedies.

To determine whether audio data corresponding to a word and/or phrase is available in a cache and/or database, the example TTS module 126 of FIG. 4 includes a TTS database querier 415. Based on a word and/or phrase to be converted, the example TTS database querier 415 of FIG. 1 queries the example TTS database 136 for associated audio data. The query may be performed based on one or more of a selected language and/or a selected speaker persona. If audio data is available in the TTS database 136, the TTS database querier 415 provides the obtained audio data to a TTS engine 420.

To convert words and/or phrases to audio data, the example TTS module 126 of FIG. 1 includes the example TTS engine 420. If audio data for a word and/or phrase was not obtained by the TTS database querier 415, the example TTS engine 420 of FIG. 4 converts prosody-annotated words and/or phrase into audio data based on one or more of a selected language and/or a selected speaker persona, and using any number and/or type(s) of algorithm(s), method(s), logic, circuit(s) and/or device(s). Additionally or alternatively, the example TTS engine 420 may access a network-based TTS synthesis server via the example network-based TTS interface 146 of FIG. 1 to obtain audio data for words and/or phrases that are not contained in the example TTS database 136. In some instances, audio data obtained from a network-based TTS synthesis server is stored in the TTS database 136 for future recall.

While an example manner of implementing the example TTS module 126 of FIG. 1 has been illustrated in FIG. 4, one or more of the elements, processes and/or devices illustrated in FIG. 4 may be combined, divided, re-arranged, omitted, eliminated and/or implemented in any other way. Further, the example abbreviation analyzer 405, the example pronunciation and prosody analyzer 410, the example TTS database querier 415, the example TTS engine and/or, more generally, the example TTS module 126 may be implemented by hardware, software, firmware and/or any combination of hardware, software and/or firmware. Thus, for example, any or the example abbreviation analyzer 405, the example pronunciation and prosody analyzer 410, the example TTS database querier 415, the example TTS engine and/or, more generally, the example TTS module 126 may be implemented by one or more circuit(s), programmable processor(s), ASIC(s), PLD (s) and/or FPLD(s), etc. When any of the appended claims are read to cover a purely software implementation, at least one of the example abbreviation analyzer 405, the example pronunciation and prosody analyzer 410, the example TTS database querier 415, the example TTS engine and/or, more generally, the example TTS module 126 are hereby expressly defined to include a tangible medium such as a memory, a DVD, a CD, etc. Further still, the TTS module 126 may include one or more elements, processes and/or devices in addition to, or instead of, those illustrated in FIG. 4, and/or may include more than one of any or all of the illustrated elements, processes and devices.

Figure 5:
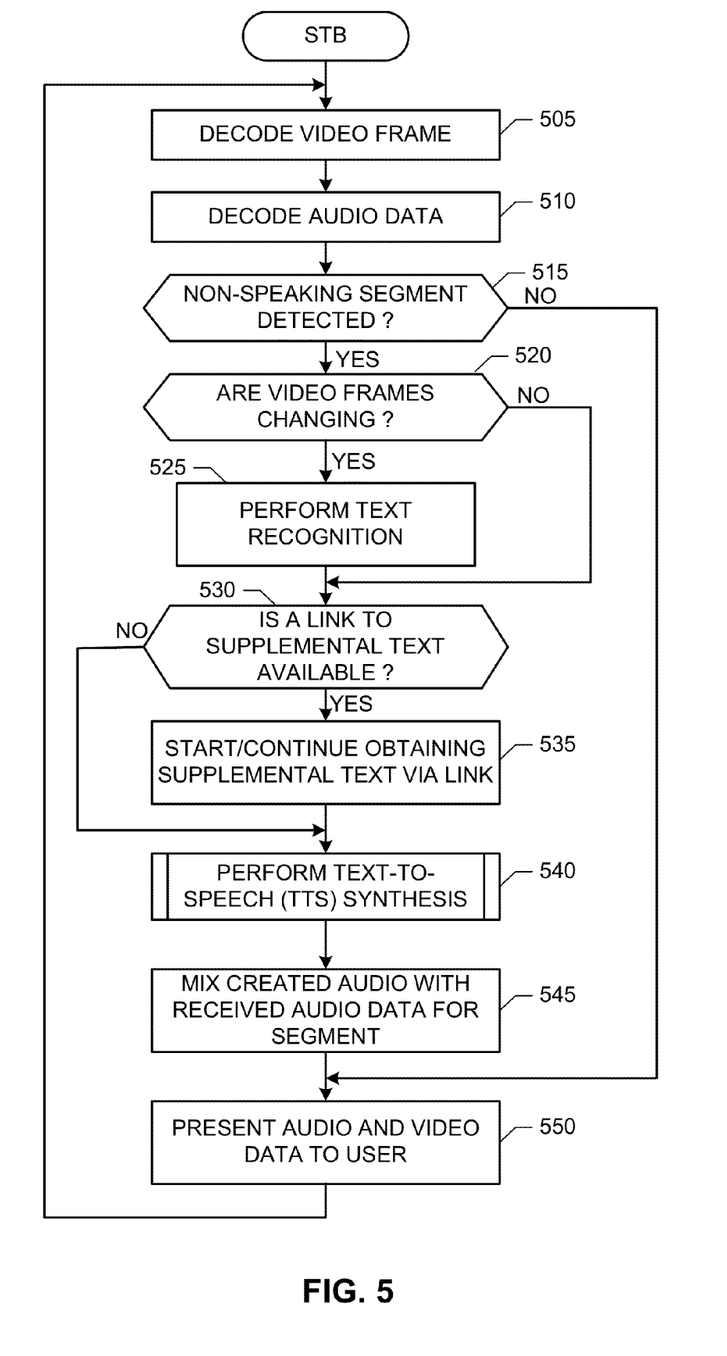
FIGS. 5 and 6 are flowcharts representative of example machine accessible instructions that may be carried out by, for example, a processor to implement the example STB and/or the example TTS modules of FIGS. 1 and 4.
Figure 6:
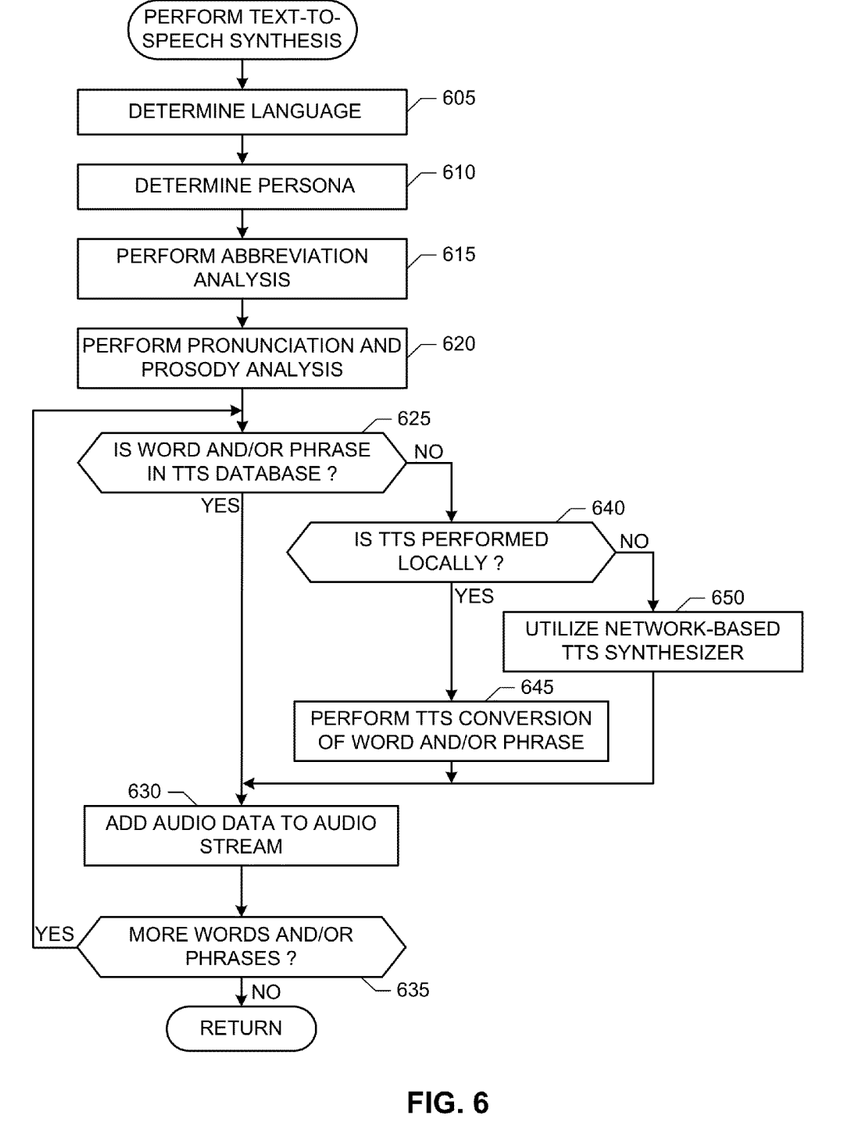

FIG. 5 is a flowchart representative of example machine accessible instructions that may be carried out to implement the example STB 100 of FIG. 1. FIG. 6 is a flowchart representative of example machine accessible instructions that may be carried out to implement either or both of the example TTS modules 126 of FIGS. 1 and 4. The example machine accessible instructions of FIGS. 5 and/or 6 may be carried out by a processor, a controller and/or any other suitable processing device. For example, the example machine accessible instructions of FIGS. 5 and/or 6 may be embodied in coded instructions stored on a tangible medium such as a flash memory, a read-only memory (ROM) and/or random-access memory (RAM) associated with a processor (e.g., the example processor P105 discussed below in connection with FIG. 7). Alternatively, some or all of the example machine accessible instructions of FIGS. 5 and/or 6 may be implemented using any combination(s) of circuit(s), ASIC(s), PLD (s), FPLD(s), discrete logic, hardware, firmware, etc. Also, some or all of the example machine accessible instructions of FIGS. 5 and/or 6 may be implemented manually or as any combination of any of the foregoing techniques, for example, any combination of firmware, software, discrete logic and/or hardware. Further, although the example operations of FIGS. 5 and 6 are described with reference to the flowcharts of FIGS. 5 and 6, many other methods of implementing the operations of FIGS. 5 and/or 6 may be employed. For example, the order of execution of the blocks may be changed, and/or one or more of the blocks described may be changed, eliminated, sub-divided, or combined. Additionally, any or all of the example machine accessible instructions of FIGS. 5 and/or 6 may be carried out sequentially and/or carried out in parallel by, for example, separate processing threads, processors, devices, discrete logic, circuits, etc.

The example machine accessible instructions of FIG. 5 begin with the example video decoder 112 of FIG. 1 decoding the next video frame of a video program that is being received (block 505). The example audio decoder 114 decodes the corresponding audio data (block 510). The example non-spoken data detector 124 determines whether the video frame corresponds to a portion of the video program not containing any spoken words (block 515). If the video frame corresponds to a non-spoken word portion of the video program (block 515), the example text-frame detector 122 determines whether the video frame has changed from the previous video frame (block 520).

If the video frame has changed (block 520), the example optical character recognizer 128 performs optical character recognition to extract displayed text (if any) (block 525). If moving text (e.g., scrolling text) is detected by the optical character recognizer 128, the optical character recognizer 128 removes any text that appears in both the current video frame and the previous video frame (block 525).

If the example metadata handler 142 determines that there is associated-text available for the current video frame (block 530), the example text acquirer 130 starts and/or continues obtaining associated text (e.g., by accessing a detected link associated with the video stream) (block 535). The example TTS module 126 converts the text obtained by the optical character recognizer 128 and/or the text acquirer 130 into audio data by, for example, executing the example machine accessible instructions of FIG. 6 (block 540). The example audio mixer 144 combines the audio data generated and/or obtained by the TTS module 126 with the audio data decoded at block 510 (block 545). The example media device interface 118 presents the combined audio data and decoded video data to the user (block 550). Control then returns to block 505 to decode the next video frame.

Returning to block 530, if a link to associated text for the video frame is not available (block 530), control proceeds to block 540 to perform TTS synthesis based on text obtained by the optical character recognizer 128 (if any).

Returning to block 520, if the video frame is substantially unchanged from the previous video frame (block 520), control proceeds to block 530 to determine whether associated text data is available.

Returning to block 515, if the video frame corresponds to a portion of the video program containing spoken words, control proceeds to block 550 to present the decoded audio and video data to the user.

The example machine accessible instructions of FIG. 6 begin when one or more words need to be converted to audio data (e.g., when called at block 540 of FIG. 5). The example TTS module 126 queries a set of TTS options 134 to determine a language (block 605) and a persona (block 610) to be used for the conversion. In some examples, the language and/or persona may depend upon the genre of video program being processed.

The example abbreviation analyzer 405 performs abbreviation analysis of the input text to convert any abbreviations into pronounceable words (block 615). The abbreviation analyzer 405 creates a string of pronounceable words. The example pronunciation and prosody analyzer 410 then adds prosody annotations to each word and/or phrase of the sequence of words (block 620).

If the example TTS database querier 415 locates audio data for the first word and/or phrase of the annotated sequence in the example TTS database 136, the example TTS engine 420 adds the audio data obtained from the TTS database 136 to the audio stream generated by the TTS module 126 (block 630). If there are more words and/or phrases to be converted (block 635), control returns to block 625 to convert the next word and/or phrase. If all words and/or phrases have been converted (block 635), control returns from the example machine accessible instructions of FIG. 5 at block 545.

Returning to block 640, if the word and/or phrase is not in the TTS database 136, the example TTS engine 420 determines whether it is to perform TTS synthesis at the STB 100 (block 640). If the TTS engine 420 is to perform the TTS synthesis (block 640), the TTS engine 420 converts the word and/or phrase to corresponding audio data (block 645), and control proceeds to block 630 to add the audio data to the generated audio stream.

If the TTS engine 420 is not to perform the TTS synthesis (block 640), the TTS engine 420 accesses the example network-based TTS synthesis server 110 via the example network-based TTS interface 146 to obtain audio data for the word and/or phrase (block 650). Control then proceeds to block 630 to add the obtained audio data to the generated audio stream.

Figure 7:
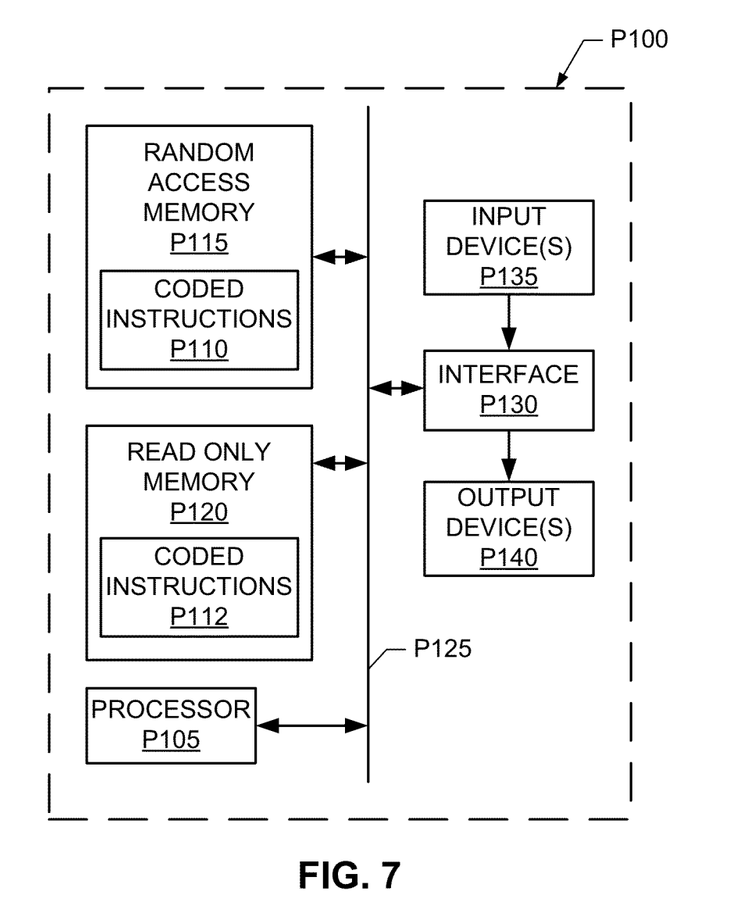
FIG. 7 is a schematic illustration of an example processor platform that may be used and/or programmed to execute the example machine accessible instructions of FIGS. 5 and/or 6 to implement the example STB and/or the example TTS modules of FIGS. 1 and 4.

FIG. 7 is a schematic diagram of an example processor platform P100 that may be used and/or programmed to implement all or a portion of any or all of the example STB 100, the example network interface 102, the example video decoder 112, the example audio decoder 114, the example media device interface 118, the example text frame detector 122, the example non-spoken data detector 124, the example TTS module 126, the example optical character recognizer 128, the example text acquirer 130, the example metadata handler 142, the example audio mixer 144, the example network-based TTS interface 146, the example abbreviation analyzer 405, the example pronunciation and prosody analyzer 410, the example TTS database querier 415 and/or the example TTS engine 420 of FIGS. 1 and/or 4. For example, the processor platform P100 can be implemented by one or more general purpose processors, processor cores, microcontrollers, etc.

The processor platform P100 of the example of FIG. 7 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine accessible instructions of FIGS. 5 and/or 6 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example TTS options 134, the example TTS database 136, the example language database 138 and/or the example persona database 140.

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130. The input devices P135 and/or output devices P140 may be used to, for example, implement the example network interface 102 and/or the example media device interface 118.

Of course, the order, size, and proportions of the memory illustrated in the example systems may vary. Additionally, although this patent discloses example systems including, among other components, software or firmware executed on hardware, such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to generate audible annotations, comprising:
    detecting, with a processor, a text portion of a media stream including a video stream, the text portion not being consumable by a blind person;
    converting, with the processor, text associated with the text portion of the media stream to a first audio stream based on a first genre type and a first language type of a first program in the media stream; and
    converting the text to a second audio stream based on a second genre type and a second language type of a second program in the media stream.

2. A method as defined in claim 1, wherein the first audio stream corresponds to a first or a second persona when the program is the first genre type or the second genre type, respectively.

3. A method as defined in claim 2, wherein the first persona comprises a male voice and the second persona comprises a female voice.

4. A method as defined in claim 1, wherein the first program genre type comprises a news program and the second program genre type comprises a situational comedy.

5. A method as defined in claim 1, further comprising associating the first audio stream with a first prosody type when the first genre type of the program is associated with the first language type.

6. A method as defined in claim 1, further comprising retrieving the text from a uniform resource locator associated with the video stream.

7. A method as defined in claim 6, wherein the uniform resource locator comprises references to facilitate audio synchronization with the program.

8. A method as defined in claim 7, further comprising delaying presentation of the program until the text from the uniform resource locator is retrieved.

9. An apparatus comprising:
    a memory comprising machine readable instructions; and
    a processor to execute the instruction to perform operations comprising:
    detecting a text portion of a media stream including a video stream, the text portion not being consumable by a blind person;
    converting text associated with the text portion of the media stream to a first audio stream based on a first genre type and a first language type of a first program in the media stream; and
    converting the text to a second audio stream based on a second genre type and a second language type of a second program in the media stream.

10. An apparatus as defined in claim 9, further comprising a persona database to compare first and second persona data, wherein the first persona data is used when the program is the first genre type, and the second persona data is used when the program is the second genre type, respectively.

11. An apparatus as defined in claim 10, wherein the first persona comprises a male voice and the second persona comprises a female voice.

12. An apparatus as defined in claim 9, wherein the first program genre type comprises a news program and the second program genre type comprises a situational comedy.

13. An apparatus as defined in claim 9, further comprising a prosody analyzer to associate the first audio stream with a first prosody type when the first genre type of the program is associated with the first language type.

14. An apparatus as defined in claim 9, further comprising a network interface to retrieve the text from a uniform resource locator associated with the video stream.

15. An apparatus as defined in claim 14, wherein the network interface is to invoke references to facilitate audio synchronization with the program.

16. An apparatus as defined in claim 15, further comprising a text-to-speech module to delay presentation of the program until the text from the uniform resource locator is retrieved.

17. A tangible machine readable storage device comprising instructions which, when executed, cause a machine to perform operations comprising:
- detecting a text portion of a media stream including a video stream, the text portion not being consumable by a blind person;
- converting text associated with the text portion of the media stream to a first audio stream based on a first genre type and a first language type of a first program in the media stream; and
- converting the text to a second audio stream based on a second genre type and a second language type of a second program in the media stream.

18. A tangible machine readable storage device as defined in claim 17, wherein the instructions, when executed, cause the machine to:
- employ a first persona when the program is the first genre type; and
- employ a second persona when the program is the second genre type, respectively.

19. A tangible machine readable storage device as defined in claim 18, wherein the instructions, when executed, cause the machine to employ a male voice for the first persona and employ the second persona with a female voice.

20. A tangible machine readable storage device as defined in claim 17, wherein the instructions, when executed, cause the machine to associate the first audio stream with a first prosody type when the first genre type of the program is associated with the first language type.

21. A tangible machine readable storage device as defined in claim 17, wherein the instructions, when executed, cause the machine to retrieve the text from a uniform resource locator associated with the video stream.

22. A tangible machine readable storage device as defined in claim 14, wherein the instructions, when executed, cause the machine to facilitate audio synchronization with the program via references from the uniform resource locator.

23. A tangible machine readable storage device as defined in claim 22, wherein the instructions, when executed, cause the machine to delay presentation of the program until the text from the uniform resource locator is retrieved.

* * * * *